US005161958A

United States Patent [19]

Landquist

[11] Patent Number: 5,161,958

[45] Date of Patent: Nov. 10, 1992

[54] VALVE DEVICE FOR AUTOMATIC CIRCULATION IN A WASTE WATER PUMP STATION

[75] Inventor: Folke Landquist, Balsta, Sweden

[73] Assignee: ITT Flygt AB, Solna, Sweden

[21] Appl. No.: 744,547

[22] Filed: Aug. 13, 1991

[30] Foreign Application Priority Data

Aug. 21, 1990 [SE] Sweden ................................ 9002711

[51] Int. Cl.[5] ........................ F04B 49/00; F04B 17/00; F16K 31/44

[52] U.S. Cl. .................................... 417/299; 417/360; 251/57

[58] Field of Search .................... 417/299, 360; 251/57

[56] References Cited

U.S. PATENT DOCUMENTS

| | | | |
|---|---|---|---|
| 4,052,035 | 10/1977 | Keny et al. | 251/57 |
| 4,265,268 | 5/1981 | Hetz | 417/299 |
| 4,726,742 | 2/1988 | Harbison et al. | 417/360 |
| 4,886,426 | 12/1989 | Surinatz | 417/360 |
| 4,925,375 | 5/1990 | Carlsson | 417/299 |

*Primary Examiner*—Richard A. Bertsch
*Assistant Examiner*—Alfred Basichas
*Attorney, Agent, or Firm*—Menotti J. Lombardi

[57] ABSTRACT

The pressure side of a submersible pump unit is provided with a valve device which during certain periods of operation opens a connection between the submersible pump and the pump station to obtain the necessary circulation of the waste water in the station. The opening and closing of the valve device is effected by a ball which is controlled by the submersible pump pressure.

10 Claims, 4 Drawing Sheets

VALVE DEVICE FOR AUTOMATIC CIRCULATION IN A WASTE WATER PUMP STATION

BACKGROUND OF THE INVENTION

The invention relates to a valve device mounted on a submersible pump for providing circulation in a waste water pump station.

As disclosed in U.S. Pat. No. 4,462,766, issued Jul. 31, 1984, sludge banks occur in waster water pump stations and other tanks in a sewage system due to poor circulation. Sludge banks can cause a number of problems including bad odors, risk of explosions, corrosion problems, etc.

This patent describes a solution which entails arranging a valve in the pump outlet, which is opened temporarily thus obtaining a circulation and flushing in the pump station. The sludge banks are dissolved and the fluid is homogenized.

In U.S. Pat. No. 4,948,342, issued Aug. 14, 1990, one inventive method and device are described for obtaining the circulation desired. In this patent, a bellows contains a sealingly connected diaphragm and valve cup, and a ball element within the diaphragm moves in dependence on the pressure situation in the valve.

SUMMARY OF THE INVENTION

An object of this invention is to provide an improved valve device for a submersible pump unit to effect automatic waste water circulation in a waste water pump station.

According to the broader aspects of the invention, the valve device has a connection to the pressure side of the submersible pump and an outlet nozzle, and a valve cup that is sealingly attached to the valve housing. The cup contains a diaphragm and an element which, in dependence of the pressure situation in the valve housing, in its one rest position, seals against a seat (in that housing thus closing the latter and which in its other rest position is contained in the valve cup) without hinderance to the flow through the valve. A bellows is attached to the valve housing and is connected to an opening in the valve cup to allow a medium to be exchanged between the bellows and the space between the valve cup and the diaphragm.

BRIEF DESCRIPTION OF THE DRAWINGS

Other objects, features and advantages of the present invention will become more fully apparent from the following detailed description of the preferred embodiment, the appended claims and the accompanying drawing in which:

DETAILED DESCRIPTION OF THE PREFERRED EMBODIMENT

Figure 1:
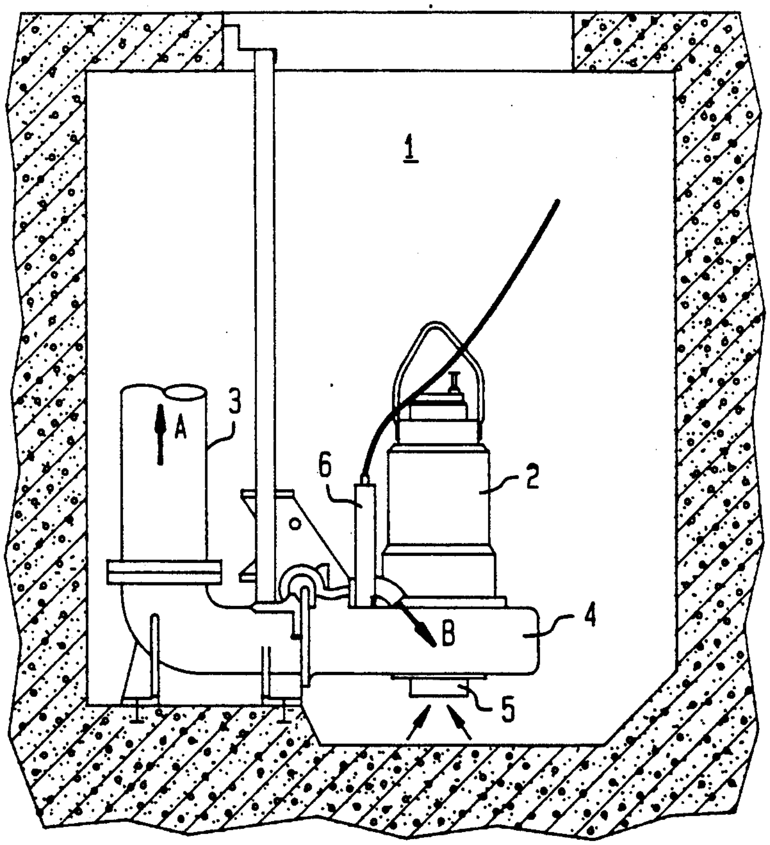
FIG. 1 (PRIOR ART)
FIG. 1 shows a pump station with a submersible pump unit and attached valve according to the prior art.
Figure 2:
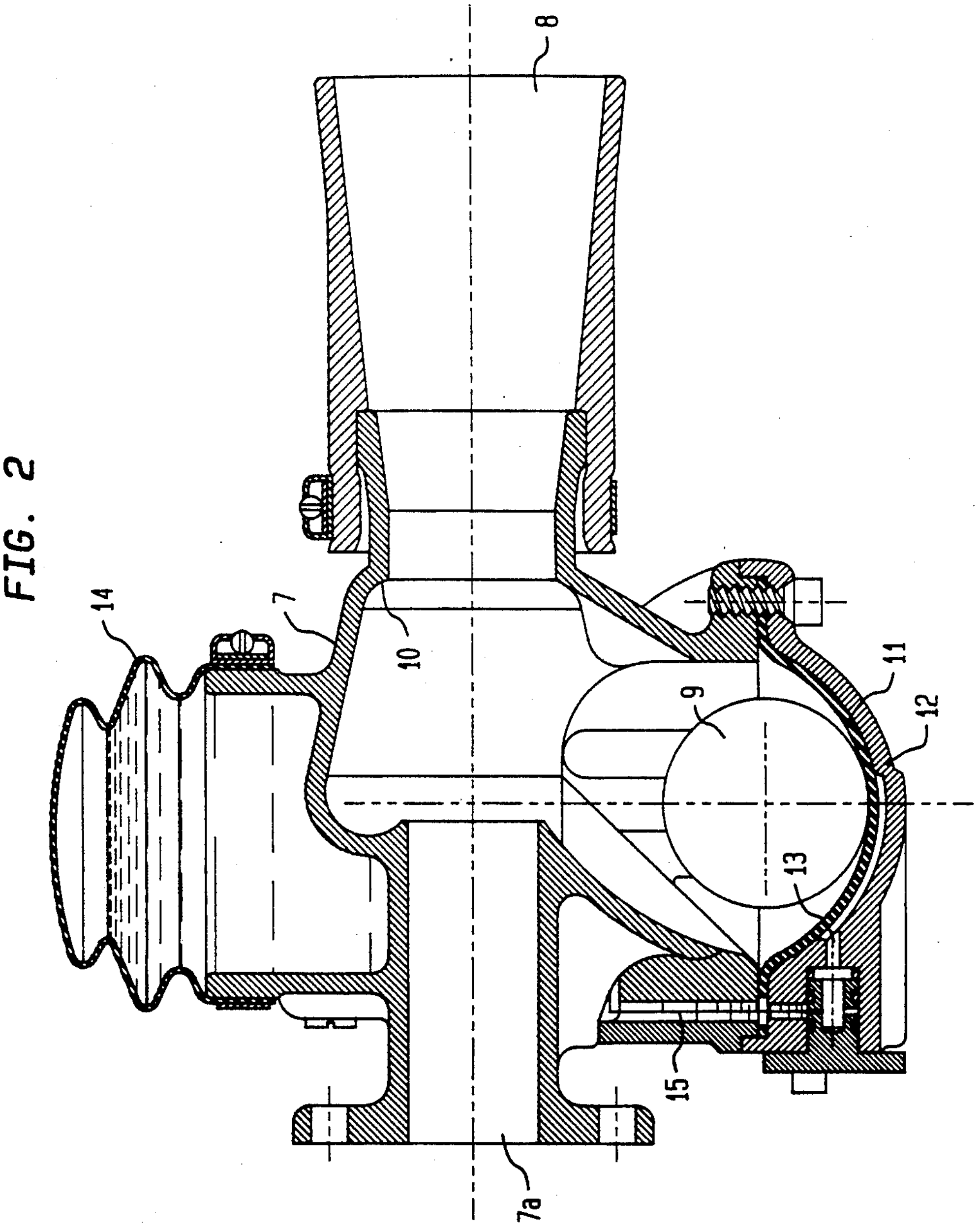
FIGS. 2 to 4 show the improved valve device in different operating positions according to the invention.
Figure 3:
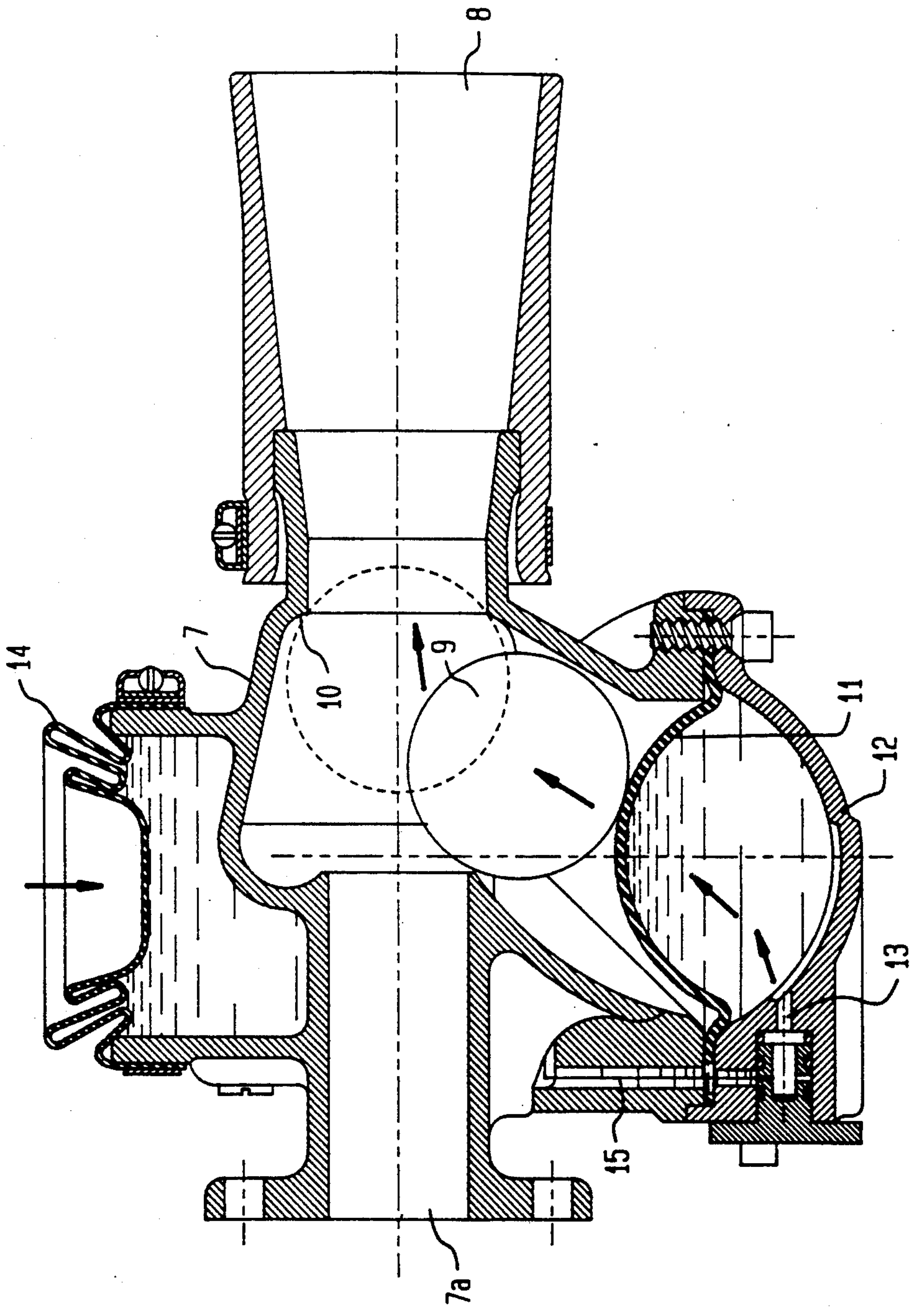
Figure 4:
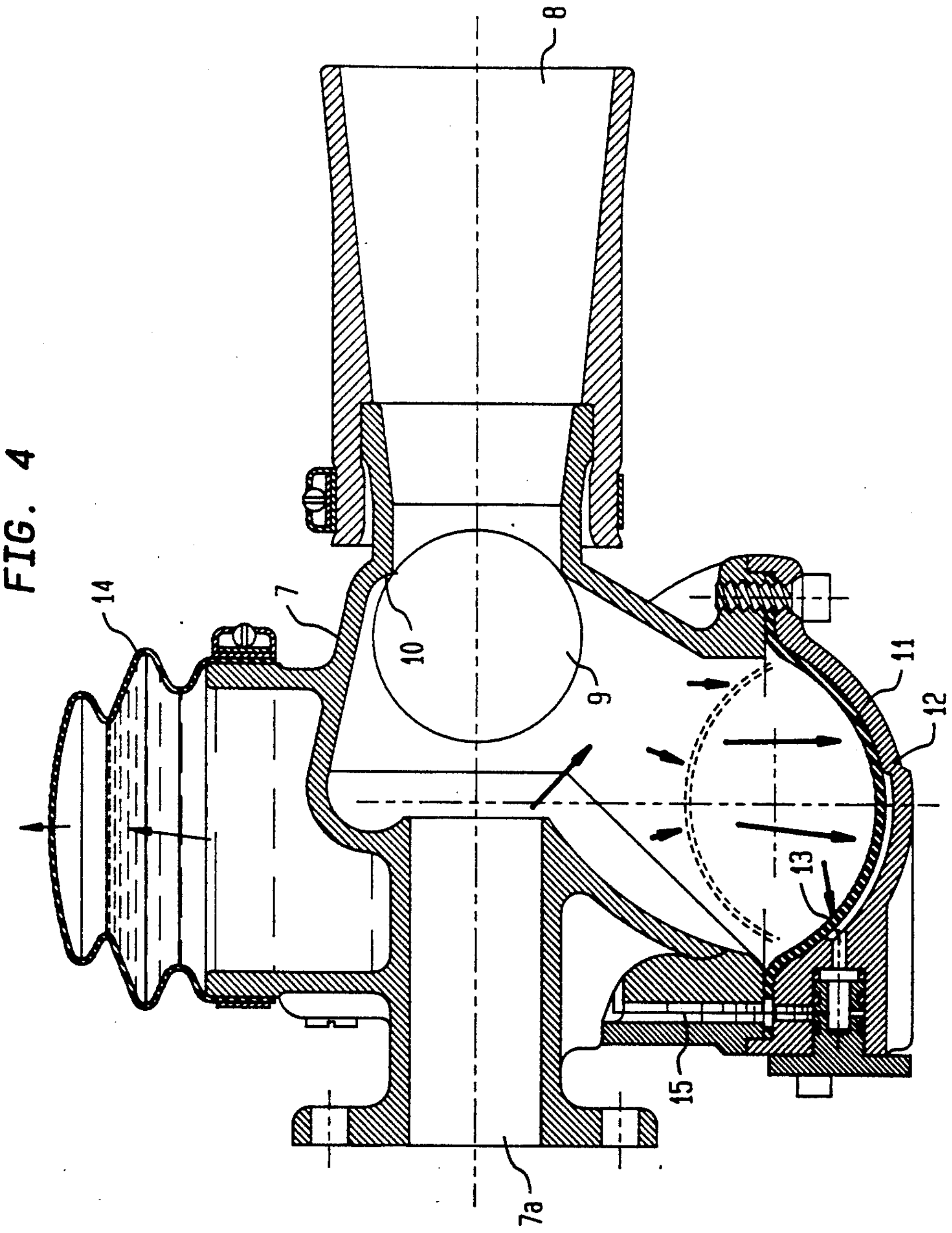

Referring now to FIG. 1, a pump station 1 with a submersible pump unit 2 is connected to a pressure pipe 3. The pump housing 4 has an inlet 5, and a mixing valve 6 is mounted on the pump housing 4. Referring additionally to FIGS. 2–4, a valve housing 7 is formed to mount on housing 4 as part of the valve 6 and has an outlet nozzle 8. A valve ball 9 is displaceable to its seat 10 in housing 7. A diaphragm 11 is located in a cup 12 mounted to housing 7, the cup having channel opening 13 which is connected by means of connection line 15 to a bellows 14 mounted on housing 7 opposite cup 12.

In operation, the valve 6 is normally closed and the pumped medium is transported from the pump housing 4 into the pressure pipe 3. The flow direction is shown by the Arrow A in FIG. 1. During certain times, for instance at pump start, the valve 6 is open, which means that a certain amount of the pumped medium flows through the valve in the direction of arrow B, and provides a strong agitation in the pump station to dislodge possible sludge banks. After a certain time, the valve 6 is closed and the pumping takes place in the normal way.

The inlet 7*a* of housing 7 forms a straight thru channel with the outlet nozzle 8. The housing 7 has attached the valve cup 12 containing the diaphragm 11 with a valve ball 9. The ball 9 is arranged to be able to close the channel in housing 7 when it is pressed against the seat 10 of housing 7.

FIG. 2 shows the valve device in the open position to cause the circulation to take place within the pump station. The valve ball 9 is in a position outside the flow path from inlet 7*a* to outlet nozzle 8. The flow path channel through the housing 7 then quickly creates an under pressure condition which effects the diaphragm 11 and causes a closing of the valve after a certain time. As the diaphragm 11 is sealingly attached to the valve housing 7, the under pressure condition in the housing will urge the diaphragm 11 to move upwards into the straight thru channel portion of the housing 7, bringing with it the valve ball 9. The movement of the diaphragm 11 is, however, prevented by the fact that also the valve cup 12 is sealingly attached in the housing 7.

At the opposite side of the housing 7, the area enclosed by bellows 14 is connected to an opening 13 in the valve cup 12 via a connection line 15. A medium preferably oil, is enclosed by the bellows and by means of the connection line 15 and the opening 13 is sucked into the space between the cup 12 and the diaphragm 11, thus allowing the diaphragm to be moved upwards into the housing 7. The area of the opening 13 and the magnitude of the underpressure condition in the valve 7 decide the speed of said movement. A simple control device connected to the opening 13 makes it possible to adjust the preferred closing time for the valve.

In FIG. 3., the arrows show the direction of movement in which the diaphragm "and the ball" are moved into the flow path through the housing 7. After the ball 9 has been moved into the flow path in the housing 7, the flowing medium presses the ball against the seat 10, thus closing the valve. This is then kept closed as long as pumping action continues.

During the time of the pumping action, the pump pressure prevails in the housing 7 which means that the diaphragm 11 is pressed back towards its initial position at a speed which is decided by the flow rate of the damping medium through the opening 13, back into the area enclosed by bellows 14. In FIG. 4 the arrows show the direction of movement with the valve in a closed position and the diaphragm has reached its initial position. When the pumping is stopped, the pressure goes down and the ball reassumes the position shown in FIG. 2, thus opening the valve before next pump start cycle.

In the foregoing description, the valve ball is heavier than the pumped medium and the diaphragm and cup arrangement therefore is placed below the valve. The invention, however, also includes an embodiment where the ball has a density below that of the pumped medium and where therefore the diaphragm device is arranged above the valve and the ball comes to the surface for opening of the valve before next pump start cycle. According to another embodiment of the invention, an outer conduit may be connected to the housing 7, where additives such as gas, chemicals, etc. may be sucked into the flow when the valve is open. This outer conduit may also be used for letting in air to delay or control the closing time at a simultaneous aeration of the pumped medium. Although the closing element is described as a valve ball 9, the invention contemplates other movable or turnable means which may be used as closing elements.

While the invention has been disclosed in connection with a preferred embodiment thereof, it should be understood that there may be other embodiments which fall within the spirit and scope of the invention as defined by the following claims.

I claim:

1. A valve mounted on a submersible pump for obtaining circulation in sewage water pump stations comprising a valve housing having an inlet connected to the pressure side of the pump and an outlet nozzle; a movable valve element (9) which, in dependence of the pressure situation in the valve, in one position it seals against a seat (10) in the valve housing (7) thus closing the latter and which in another position it is contained within a diaphragm (11) within a valve cup (12) arranged out of the flow through the valve; and bellows (14) sealingly attached to the valve (6) and positioned opposite said cup and enclosing an area fluidly connected to said cup.

2. A valve according to claim 1, wherein the valve element (9) in its closed position is pressed against its seat (10) by the pump pressure.

3. A valve according to claim 1, wherein the valve element (9) is forced from its open to its closed position by under pressure which is created in the valve by the flow thru the valve.

4. A valve according to claim 3, where the valve element (9) is moved from open to closed position at a speed which is determined by the area of an opening (13) in the valve housing connecting the area enclosed by the bellows (14) and the valve cup (12) which opening allows a medium to be exchanged between the enclosed area and the space between the valve cup (12) and the diaphragm (11) when the valve element (9) is moved.

5. In a sewage pump water station containing at least one pump unit centrifugal pumps of the submersible type, a valve device connected to one or several of the pump units, which automatically during a certain limited period connect the pressure side of a pump with the pump station thus obtaining a circulation of the pumped medium, said valve device comprising a valve housing (7) with an inlet connected to the pressure side of the pump and an outlet nozzle; a valve cup (12) is sealingly mounted to the valve housing (7) which cup contains a diaphragm (11) and a valve element (9), which, in dependence of the pressure situation in the valve housing (7), in one position seals against a seat (10) in said housing thus closing the flow path through the housing and which in another position is contained in the valve cup (12) without hinderance to the flow through the housing and a bellows(14) is attached to the valve housing (7) opposite said cup and enclosing an area which is fluid connected to an opening in the valve cu (12) to allow a medium to be exchanged between the enclosed area of the bellows (14) and the space between the valve cup (12) and the diaphragm (11).

6. A device according to claim 5, wherein the enclosed area of the bellows (14) is filled with a damping medium.

7. A device according to claim 6, wherein the valve element (9) is a ball.

8. In combination:

a valve housing with a flow channel connected to the pressure side of a pump and having an outlet nozzle and a seat in said flow channel;

a bellows enclosing an area containing a fluid medium and being sealingly attached to said housing; a diaphragm and valve cup sealing mounted to said housing and oppositely positioned from said bellows;

a valve ball located within said diaphragm and movable from a first position to a second position against said seat depending on the flow in said channel; and said valve cup having an opening to permit a fluid medium to be exchanged by means of a fluid connection in said housing and said cup and said enclosed area of said bellows.

9. The combination of claim 8 wherein said fluid medium is a damping sit medium.

10. The combination of claim 9 wherein the size of said opening controls the speed of the valve ball movement.

* * * * *